United States Patent
Shibata et al.

(10) Patent No.: US 12,466,930 B2
(45) Date of Patent: Nov. 11, 2025

(54) POROUS CELLULOSE PARTICLES AND METHOD FOR PRODUCING SAME

(71) Applicant: Daicel Corporation, Osaka (JP)

(72) Inventors: Toru Shibata, Tokyo (JP); Hiromichi Okura, Tokyo (JP); Yuki Hirabayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 885 days.

(21) Appl. No.: 17/631,506

(22) PCT Filed: Jul. 30, 2020

(86) PCT No.: PCT/JP2020/029221
§ 371 (c)(1),
(2) Date: Jan. 31, 2022

(87) PCT Pub. No.: WO2021/024900
PCT Pub. Date: Feb. 11, 2021

(65) Prior Publication Data
US 2022/0275163 A1   Sep. 1, 2022

(30) Foreign Application Priority Data
Aug. 2, 2019 (JP) .................... 2019-142886

(51) Int. Cl.
*C08J 9/28* (2006.01)
(52) U.S. Cl.
CPC ............. *C08J 9/28* (2013.01); *C08J 2301/02* (2013.01); *C08J 2405/08* (2013.01)

(58) Field of Classification Search
CPC ...... C08J 9/28; C08J 2301/02; C08J 2405/08; C08J 3/16; C08J 2201/0546; C08J 9/0061; C08J 2205/044; C08J 3/14; C08L 1/02
See application file for complete search history.

(56) References Cited

U.S. PATENT DOCUMENTS 6,670,469 B1 * 12/2003 Beyer .................... A61P 17/02
536/124

FOREIGN PATENT DOCUMENTS

| CN | 102553545 A | * | 7/2012 |
| CN | 104530449 A | | 4/2015 |

(Continued)

OTHER PUBLICATIONS

English language machine translation of CN 104530449 A, Li et al, Apr. 22, 2015. (Year: 2024).*

(Continued)

*Primary Examiner* — Stefanie J Cohen
*Assistant Examiner* — Caroline D. Liott
(74) *Attorney, Agent, or Firm* — XSENSUS LLP

(57) ABSTRACT

Provided are porous cellulose particles containing chitosan and having predetermined pores on a surface and a predetermined particle diameter, and a method for producing the porous cellulose particles. Porous cellulose particles including unsubstituted cellulose and chitosan, wherein a content of the chitosan is not greater than 20 mass % in a total of 100 mass % of the unsubstituted cellulose and the chitosan, pores having a diameter from 0.05 to 5 μm are observed in an image of surfaces of the porous cellulose particles observed by a scanning electron microscope, and a proportion of porous cellulose particles having a particle diameter from 10 to 200 μm is not less than 90 mass %.

5 Claims, 2 Drawing Sheets

(56) References Cited

FOREIGN PATENT DOCUMENTS

| CN | 108217892 A | 6/2018 |
|----|-------------|--------|
| CN | 109517212 A | 3/2019 |
| WO | 2020/121805 A1 | 6/2020 |

OTHER PUBLICATIONS

Almeida et al, "Chitosan, sisal cellulose, and biocomposite chitosan/sisal cellulose films prepared from thiourea/NaOH aqueous solution," (2010), Carbohydrate Polymers, 80, pp. 655-664. (Year: 2010).*

Peng et al, Nanoporous Magnetic Cellulose-Chitosan Composite Microspheres: Preparation, Characterization, and Application for Cu(II) Adsorption, I&EC Research, ACS Publications, Jan. 24, 2014, 53, pp. 2106-2113. (Year: 2014).*

Kim et al, "Characterization of cellulose-chitosan gels prepared using a LiOH/urea aqueous solution," Cellulose, May 28, 2019, 26, pp. 6189-6199. (Year: 2019).*

Machine English translation of Dai, Ya, CN-102553545-A, Jul. 11, 2012. (Year: 2021).*

Office Action issued on Mar. 1, 2024, in corresponding Chinese patent Application No. 202080053809.4, 13 pages.

Jiayi Yang et al., "Spherical nanocomposite particles prepared from mixed cellulose-chitosan solutions", Cellulose, 2016, vol. 23, pp. 3105-3115, total 11 pages.

International Search Report and Written Opinion mailed on Oct. 6, 2020, received for PCT Application PCT/JP2020/029221, filed on Jul. 30, 2020, 9 pages including English Translation.

Yang et al., "Spherical Nanocomposite Particles Prepared From Mixed Cellulose-Chitosan Solutions", Cellulose, vol. 23, No. 5, Oct. 2016, pp. 3105-3115.

Office Action issued Dec. 1, 2023 in Indian Patent Application No. 202247005334, 6 pages.

English translation of International Search Report and Written Opinion mailed on Oct. 6, 2020, in corresponding PCT/JP2020/029221, 6 pages.

Abdul Khalil H.P.S et al., "A review on chitosan-cellulose blends and nanocellulose reinforced chitosan biocomposites: Properties and their applications", Carbohydrate Polymers, vol. 150, 2016, pp. 216-226, total 11 pages.

Fangbing Lv et al., "Characterization of chitosan microparticles reinforced cellulose biocomposite sponges regenerated from ionic liquid", Cellulose, 2014, vol. 21, pp. 4405-4418, total 14 pages.

Yawo-Kuo Twu et al., "Preparation and sorption activity of chitosan/cellulose blend beads", Carbohydrate Polymers, vol. 54, 2003, pp. 425-430, total 6 pages.

\* cited by examiner

POROUS CELLULOSE PARTICLES AND METHOD FOR PRODUCING SAME

CROSS-REFERENCE TO RELATED APPLICATIONS

The present application is based on PCT/JP2020/029221 filed on Jul. 30, 2020, and claims priority to Japanese Application No. 2019-142886 filed on Aug. 2, 2019, the entire contents of each are incorporated herein by reference.

TECHNICAL FIELD

The present disclosure relates to porous cellulose particles and a method for producing the same.

BACKGROUND ART

Polysaccharides represented by cellulose, and derivatives thereof are used in a variety of applications. For example, these microporous materials themselves can serve as adsorbents, and when the surface of these microporous materials is subjected to some sort of chemical modification, functions such as adsorption, separation, and catalytic functions can be imparted.

For example, various methods for producing a matrix for separating biopolymers, the matrix using cellulose, agarose, and the like, have been disclosed, and usefulness thereof is well known. In order to impart functionality to the surface of cellulose or other polysaccharides, chemical modification is performed. For example, when an —OH group of sugar is reacted with chloroacetic acid under a basic condition, carboxymethyl ether is produced, and when an —OH group of sugar is reacted with 1-chloro-2-(diethylamino)ethane under a basic condition, diethylaminoethyl ether is produced, and each of the products is utilized as a weak ion exchanger. However, such chemical modification not only increases the manufacturing cost, but also requires the use of harmful chemicals and may adversely affect micro to macro structures of particles. Therefore, a more convenient method for introducing functional groups is desired.

One method for solving such a problem is to blend a polymer having a function that cellulose does not originally have. In this sense, if chitosan containing an amino group having anion exchange ability and capable of serving as a scaffold for bonding various atomic groups can be blended, various functionalities can be expected to be imparted to cellulose beads. Since cellulose and chitosan do not necessarily have a common solvent, there is an attempt to mix one powder with the other solution and mold the mixture (refer to Patent Documents 1 and 2). However, the molded product obtained in this way retains the properties of cellulose and chitosan as they are. Therefore, when the molded product is washed with an acidic aqueous solution for example, chitosan is eluted.

In addition, for example, Patent Document 3 discloses that a predetermined amount of spray-dried chitosan is first dissolved in N-methylmorpholine N-oxide (NMMO), and then cellulose is added to form a solution having a composition ratio of chitosan and cellulose from 0/100 to 5/95, and this solution is dripped from a syringe into water as droplets to be coagulated. However, the formed beads have a diameter from 2 to 3 mm, and no pores on a surface were observed by SEM observation of a freeze-dried sample. The particle diameter of the beads and absence of open pores on the surface of the beads disclosed in Patent Document 3 indicate that the beads are not suitable for a process requiring the high rate of mass transfer such as chromatography, and in particular, they are practically unapplicable for a chromatography process that handles a high molecular weight sample such as protein or nucleic acid.

CITATION LIST

Patent Document

Non-Patent Document 1: Carbohydrate Polymers, 150 (2016), Pages 216-226
Non-Patent Document 2: Cellulose (2014) 21: 4405-4418
Non-Patent Document 3: Carbohydrate Polymers, 54, (4) 2003, 425-43

SUMMARY OF INVENTION

Technical Problem

A main object of the present disclosure is to provide porous cellulose particles containing chitosan and having predetermined pores on a surface and a predetermined particle diameter, and a method for producing the porous cellulose particles.

Solution to Problem

In comparison with the known technique as described above, the inventors of the present disclosure have paid attention to, in the development of porous cellulose particles containing chitosan, the use of an aqueous solution containing alkali hydroxide and urea as a solvent that is inexpensive, safe, and has a low environmental load such as odor. However, chitosan, which is a basic polymer, is well soluble in an acid, but is generally hardly soluble in an alkaline aqueous solution, and in fact, even when commercially available chitosan is added to an alkali hydroxide solution and an aqueous urea solution, chitosan is not dissolved at all.

Therefore, the inventors of the present disclosure have succeeded in dissolving chitosan, by dissolving once in a small amount of acid, adding an excessive amount of alkali hydroxide and urea, and then cooling the mixture; and by mixing this with a cellulose solution of the same solvent, to produce porous cellulose particles. These porous cellulose particles contain the chitosan while being porous cellulose particles, and surprisingly, exhibit characteristics of suppressed chitosan elution even when immersed in an acid aqueous solution. Such porous cellulose particles can serve as an anion exchanger, a metal ion adsorbent, and a chromatography carrier in an environment of an appropriate pH. Furthermore, by modifying the amino group of the chitosan, various functions can be further imparted.

The present disclosure was achieved through further examinations based on these findings.

Item 1. porous cellulose particles including: unsubstituted cellulose and chitosan,
wherein a content of the chitosan is not greater than 20 mass % in a total of 100 mass % of the unsubstituted cellulose and the chitosan,
pores having a diameter from 0.05 to 5 µm are observed in an image of surfaces of the porous cellulose particles observed by a scanning electron microscope, and
a proportion of porous cellulose particles having a particle diameter of 10 to 200 µm is not less than 90 mass %.

Item 2. The porous cellulose particles according to Item 1, wherein a solid content of the porous cellulose particles in a hydrated state is not greater than 10 mass %, the solid content being measured by a solid content measurement method, and the method includes performing operation of:

allowing the porous cellulose particles that have settled in pure water to stand under atmospheric pressure in an environment at a temperature of 25° C. for one day or more; then, drawing approximately 2 mL of the porous cellulose particles in the pure water with a pipette, dispersing the drawn fraction in 20 ml of a solution of neutral detergent diluted 1000 times with pure water, and allowing the solution to stand for one day or more to precipitate the porous cellulose particles; then, removing a supernatant by decanting, placing approximately ⅓ of remaining slurry, which serves as one measurement sample, onto filter paper corresponding to No. 3 type specified in JIS P 3801 [Filter paper (for chemical analysis)], leaving the slurry to stand for 20 seconds to remove excessive moisture, separating a lump of the porous cellulose particles remaining on the filter paper from the filter paper, and weighing the lump, the weight being defined as a wet mass of the porous cellulose particles; and then, drying the porous cellulose particles in an oven at 80° C. for 2 hours, and weighing the porous cellulose particles, the weight being defined as a dry mass, and performing the operation on three measurement samples, calculating a respective proportion of dry mass to the wet mass, and determining an average value of three values, the average value being defined as a solid content.

Item 3. A method for producing porous cellulose particles, including:

preparing a mixed solution in which an unsubstituted cellulose solution and a chitosan solution are mixed; and bringing the mixed solution into contact with a coagulation solvent, wherein an aqueous solution containing alkali hydroxide and urea is used as a solvent of the mixed solution.

Item 4. The method for producing porous cellulose particles according to Item 3, further including:

washing the porous cellulose particles with an acid, the porous cellulose particles having been formed by the bringing the mixed solution into contact with the coagulation solvent.

Item 5. The method for producing porous cellulose particles according to Item 4, wherein a content of the chitosan in the porous cellulose particles after the acid washing is not less than 1 mass % and not greater than 20 mass % in a total of 100 mass % of the unsubstituted cellulose and the chitosan.

Item 6. The method for producing porous cellulose particles according to any one of Items 3 to 5, wherein the preparing a mixed solution includes:

dissolving chitosan in an aqueous solution containing acid and further mixing the solution with alkali hydroxide and urea to prepare the chitosan solution, mixing unsubstituted cellulose, alkali hydroxide, urea, and water to prepare the unsubstituted cellulose solution, and mixing the chitosan solution cooled to a temperature of not higher than −10° C. and the unsubstituted cellulose solution.

Advantageous Effects of Invention

According to the present disclosure, it is possible to provide porous cellulose particles containing chitosan and having predetermined pores on a surface and a predetermined particle diameter, and a method for producing the porous cellulose particles.

DESCRIPTION OF EMBODIMENTS

Figure 1:
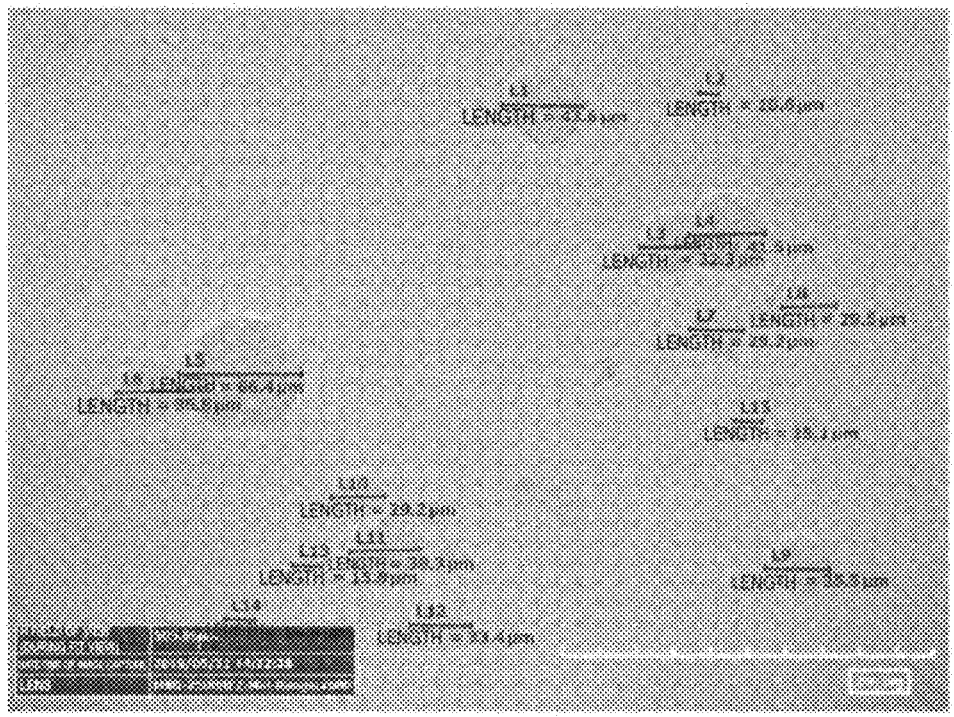
FIG. 1 is an image of porous cellulose particles obtained in a first example observed with an optical microscope.

Porous cellulose particles of the present disclosure includes unsubstituted cellulose and chitosan, wherein a content of the chitosan is not greater than 20 mass % in a total of 100 mass % of the unsubstituted cellulose and the chitosan, pores having a diameter from 0.05 to 5 μm are observed in an image of surfaces of the porous cellulose particles observed by a scanning electron microscope, and a proportion of porous cellulose particles having a particle diameter from 10 to 200 μm is not less than 90 mass %. The porous cellulose particles of the present disclosure contain chitosan and having predetermined pores on a surface and a predetermined particle diameter.

Further, the porous cellulose particles of the present disclosure that exhibit such functionality can be suitably produced by employing, for example, as described below, a method for producing porous cellulose particles, the method including preparing a mixed solution in which an unsubstituted cellulose solution and a chitosan solution are mixed, wherein an aqueous solution containing alkali hydroxide and urea is used as a solvent of the mixed solution.

Hereinafter, the porous cellulose particles and the production method of the present disclosure will be described in detail.

1. Porous Cellulose Particles

The porous cellulose particles of the present disclosure include cellulose which is unsubstituted (hereinafter, may simply be referred to as "unsubstituted cellulose") and chitosan.

In the present disclosure, unsubstituted cellulose means that a hydroxyl group contained in the cellulose is not substantially substituted (that is, it is not substituted cellulose), and a degree of substitution of the hydroxyl group is, for example, not greater than 0.05. The degree of polymerization of the unsubstituted cellulose is not particularly limited, and is preferably, for example, not greater than 1000. When the degree of polymerization is not greater than 1000, dispersibility and swelling properties in an alkaline aqueous solution described later are high, and thus such a degree of polymerization is preferable. When the degree of polymerization of the unsubstituted cellulose is not less than 10, the mechanical strength of the obtained porous cellulose particles is increased, and thus such a degree of polymerization is preferable. A preferable range of the degree of polymerization of the unsubstituted cellulose is approximately from 10 to 1000.

In addition, in the present disclosure, chitosan is a β-1, 4-dehydration condensation polymer of glucosamine. Chitosan is industrially produced by preparing chitin, which is a component of a crab shell, and further hydrolyzing an acetyl group by alkaline hydrolysis, but the chitosan usually sold has more or less unreacted acetyl groups left, and a product with not less than 60% conversion of the acetylamino groups to amino groups are generally called chitosan. Although the acetyl group content and the polymerization degree vary, in the present disclosure, there is no particular limitation as long as chitosan can be mixed with porous cellulose. However, from the viewpoint of suppressing elution from the porous cellulose particles, the number average polymerization degree of the chitosan is desirably not less than 10. An upper limit of the number average polymerization degree of the chitosan is, for example, not greater than 500, and a preferable range thereof is from 50 to 300.

In the porous cellulose particles of the present disclosure, the content of the chitosan is not greater than 20 mass % in the total of 100 mass % of the unsubstituted cellulose and chitosan. In the present disclosure, by setting the content of the chitosan to 20 mass %, the porous cellulose particles have a predetermined pore on the surface and have a predetermined particle diameter. The upper limit of the content of the chitosan is preferably not greater than 15 mass %, more preferably not greater than 10 mass %, and even more preferably not greater than 8 mass %, and the lower limit is preferably not less than 1 mass %, more preferably not less than 2 mass %, and even more preferably not less than 3 mass %. Preferable ranges include approximately from 1 to 20 mass %, approximately from 1 to 15 mass %, approximately from 1 to 10 mass %, approximately from 1 to 8 mass %, approximately from 2 to 20 mass %, approximately from 2 to 15 mass %, approximately from 2 to 10 mass %, approximately from 2 to 8 mass %, approximately from 3 to 20 mass %, approximately from 3 to 15 mass %, approximately from 3 to 10 mass %, and approximately from 3 to 8 mass %. Note that the chitosan content can be measured by drying the porous cellulose washed with pure water or the like, and then performing common calcinating elemental analysis (nitrogen content value is multiplied by 161/14 can be converted to the chitosan content).

The porous cellulose particles of the present disclosure are porous in which pores of a diameter from 0.05 to 5 μm are observed in an image observed by scanning electron microscopy. In the porous cellulose particles of the present disclosure, the proportion of porous cellulose particles having a particle diameter from 10 to 200 μm is not less than 90 mass %. An upper limit of the proportion is, for example, not greater than 95 mass %, not greater than 98 mass %, not greater than 99 mass %, or not greater than 100 mass %. Even when the porous cellulose particles of the present disclosure include porous cellulose particles having a particle diameter other than the range from 10 to 200 μm, the particle diameter of the porous cellulose particles of the present disclosure is preferably in a range of approximately from 1 to 600 μm.

One of applications of the porous cellulose particles of the present disclosure is a carrier with which an atomic group having some functions is bonded to the surface of the carrier and selective separation or reaction can be performed. In many cases, the porous cellulose particles are each in a form of a fine particle, and are packed in a column to be used for separation and purification by chromatography, or are dispersed in a liquid to be used for selective adsorption or a selective reaction. For this purpose, rapid diffusion or permeation of a substance within the carrier particle or between the carrier particles is essential. Therefore, the porous cellulose particles are required to have a predetermined particle diameter and a predetermined opening. Further, the porous cellulose particles have a structure in which a ratio of the space is overwhelmingly larger than that of a solid (for example, a structure in which fibers are entangled). Such a structure can be manifested from formation of a low-density gel in which the solid content of the porous cellulose particles in a hydrated state is not greater than 10 mass %. That is, in such a structure, although an external appearance of the porous cellulose particles is that of a solid particle, a space of not greater than 5 μm, which is not observed with naked eyes, occupies approximately not less than 90 vol %, and such pores or spaces are filled with a liquid (water in the case of a hydrated gel). The solid content is, for example, not less than 1 mass %, preferably not less than 3 mass %, and the preferable range includes from 1 to 10 mass % and from 3 to 10 mass %. The solid content of porous cellulose particles in the hydrated state is measured by the following method.

(Measurement of Solid Content)

The porous cellulose particles that have settled in pure water are allowed to stand under atmospheric pressure in an environment at a temperature of 25° C. for one day or more (normally, within 3 days). Next, approximately 2 mL of the porous cellulose particles in the pure water are drawn with a pipette, the drawn fraction is dispersed in 20 ml of a solution of a neutral detergent (for example, Mama Lemon, available from Lion Corporation) diluted 1000 times with pure water, and the solution is allowed to stand for one day or more (normally, within 3 days) to precipitate the porous cellulose particles. Thereafter, a supernatant is removed by decanting, and approximately ⅓ of remaining slurry, which served as one measurement sample, is placed onto filter paper (No. 131, 150 mm, ADVANTEC) corresponding to No. 3 type specified in JIS P 3801 [Filter paper (for chemical analysis)], the slurry is left to stand for 20 seconds to remove excessive moisture, a lump of the porous cellulose particles remaining on the filter paper is separated from the filter paper, and the lump is weighed, and this weight is defined as a wet mass of the porous cellulose particles. The porous cellulose particles are then dried in an oven at 80° C. for 2 hours to obtain dry mass. These operations are performed on three measurement samples, a respective proportion of dry mass to the wet mass is calculated, and the average value of three values obtained is defined as a solid content.

The porous cellulose particles of the present disclosure are preferably obtained in a state of being dispersed or immersed in water as described later. The porous cellulose particles of the present disclosure are in a hydrated state in water, and form a hydrated gel. In addition, the porous cellulose particles of the present disclosure can be usually stored in a wet state.

In the case of long-term storage in a wet state, a preservative such as an alcohol or sodium azide is added to prevent spoilage. In addition, the porous cellulose to which glycerin, a saccharide, urea, or the like has been added can also be dried, preferably freeze-dried.

In addition, the porous cellulose particles of the present disclosure can be preferably used for, for example, size exclusion chromatography since it exhibits the functionality that is not imparted to the porous cellulose composed of the unsubstituted cellulose itself. Furthermore, this again indicates that chromatographic separation by various modes besides size exclusion can also be used. These other modes include modes such as ion exchange chromatography, hydrophobic interaction chromatography, and affinity chromatography.

In addition, the porous cellulose particles of the present disclosure can be used as a separating agent having improved strength due to crosslinking between cellulose or chitosan chains via covalent bonding using a crosslinking agent.

An affinity ligand can be immobilized on the porous cellulose particles of the present disclosure or crosslinked porous cellulose medium, and thus adsorbent can also be produced. The adsorbent can also be used as a separating agent for affinity chromatography.

In the present disclosure, the method for producing porous cellulose particles is not particularly limited as long as the porous cellulose of the present disclosure that has the above configuration is obtained, and the porous cellulose porous cellulose particle can be suitably produced by the production method described in the following section "2. Method for producing porous cellulose porous cellulose particles".

2. Method for Producing Porous Cellulose Particles

A method for producing porous cellulose particles includes preparing a mixed solution in which an unsubstituted cellulose solution and a chitosan solution are mixed, wherein an aqueous solution containing alkali hydroxide and urea is used as a solvent of the mixed solution. Details of the unsubstituted cellulose, chitosan, and the like are as described above in the section of "1. Porous cellulose particle".

(Preparing Mixed Solution)

The preparing mixed solution corresponds to preparing a mixed solution in which an unsubstituted cellulose solution and a chitosan solution are mixed.

The unsubstituted cellulose solution is prepared using a solvent capable of dissolving the unsubstituted cellulose. The chitosan solution is prepared using a solvent capable of dissolving chitosan. It is known that the unsubstituted cellulose is well dissolved in an alkali hydroxide solution or an alkali hydroxide-urea solution (urea-alkali hydroxide solution, including such as urea and thiourea). On the other hand, chitosan having an amino group and being basic is usually not soluble in such an aqueous solution. However, when the chitosan is dissolved in water containing approximately an equal amount of acid, a predetermined amount of alkali hydroxide and urea are added thereto, the mixture is cooled (preferably approximately from −10° C. to −15° C.) while being stirred, and then the mixture is continuously stirred while being returned to room temperature, a substantially uniform chitosan solution is obtained with slightly thixotropy. When this operation is repeated, a solution gradually becomes a uniform chitosan solution. Therefore, in the present disclosure, it is preferable to use an aqueous solution containing alkali hydroxide and urea as the solvent of both the unsubstituted cellulose solution and the chitosan solution, and as a result, an aqueous solution containing alkali hydroxide and urea can be used as the solvent of the mixed solution.

That is, in the method for producing porous cellulose particles of the present disclosure, the preparing of mixed solution preferably includes: dissolving chitosan in an aqueous solution containing acid and mixing alkali hydroxide and urea to prepare the chitosan solution; mixing unsubstituted cellulose, alkali hydroxide, urea, and water to prepare the unsubstituted cellulose solution; and mixing the chitosan solution cooled to a temperature of not higher than −10° C. (preferably approximately from −10° C. to −15° C.) and the unsubstituted cellulose solution.

Specific examples of the aqueous solution containing alkali hydroxide and urea include an aqueous solution containing alkali hydroxide at from 7 to 10 mass % and urea (may be thiourea, hereinafter, the same applies) at from 5 to 15 mass % (urea-alkali hydroxide aqueous solution). As the alkali hydroxide, lithium hydroxide and sodium hydroxide are preferable in terms of good solubility of unsubstituted cellulose and chitosan, and sodium hydroxide is preferable from the viewpoint of raw material cost. In a solvent based on this alkali hydroxide aqueous solution, the solute (unsubstituted cellulose, chitosan) and the solvent are preferably cooled to from −10° C. to −15° C. while stirring, and then the solution is made into a fluid solution by performing one or plural times of operations of bringing back the solution to ambient temperature. Further, when an insoluble matter remains and adversely affects a function of a final product, the insoluble matter can be removed by filtration or centrifugation.

The unsubstituted cellulose solution refers to a liquid containing unsubstituted cellulose, and exhibits fluidity and is solidified in a state where the unsubstituted cellulose and chitosan are miscible with each other when a mixed solution mixed with a chitosan solution is brought into contact with a coagulation solvent. It does not matter whether unsubstituted cellulose molecules may be dispersed in the unsubstituted cellulose solution, some aggregates may remain, or fine fibrous matters may be merely dispersed (sometimes referred to as a dispersion). That is, in the method for producing porous cellulose particles according to the present disclosure, the unsubstituted cellulose solution means a liquid containing unsubstituted cellulose, and the term encompasses a dispersion in which unsubstituted cellulose is dispersed in a liquid, and a solution in which unsubstituted cellulose is dissolved in a liquid. In the method for producing porous cellulose particles of the present disclosure, when an unsubstituted cellulose solution is prepared, it is sufficient that the unsubstituted cellulose solution contains the unsubstituted cellulose, and the form may be either dispersion/dissolution or a mixed state thereof.

The same applies to the chitosan solution, and the chitosan solution refers to a liquid containing a chitosan, which exhibits the fluidity and is solidified in a state where the unsubstituted cellulose and the chitosan are miscible with each other when a mixed solution mixed with an unsubstituted cellulose solution is brought into contact with a coagulation solvent. It does not matter whether chitosan molecules may be dispersed in the chitosan solution, some aggregates may remain, or fine fibrous matters may be merely dispersed (sometimes referred to as a dispersion). That is, in the method for producing porous cellulose particles according to the present disclosure, the chitosan solution means a liquid containing chitosan, and the term encompasses a dispersion in which chitosan is dispersed in a liquid, and a solution in which chitosan is dissolved in a liquid. In the method for producing porous cellulose particles of the present disclosure, when a chitosan solution is prepared, it is sufficient that the chitosan solution contains chitosan, and the form may be either dispersion/dissolution or a mixed state thereof.

The same applies to the mixed solution, and the mixed solution refers to a liquid containing unsubstituted cellulose and chitosan, which exhibits the fluidity and is solidified in a state where the unsubstituted cellulose and chitosan are miscible with each other when a mixed solution is brought into contact with a coagulation solvent, and it does not matter whether unsubstituted cellulose molecules and chitosan molecules may be dispersed in the mixed solution, some aggregates may remain, or fine fibrous matters may be merely dispersed (sometimes referred to as a dispersion). That is, in the method for producing a porous cellulose particles according to the present disclosure, the mixed solution means a liquid containing unsubstituted cellulose and chitosan, and the term encompasses a dispersion in which unsubstituted cellulose or chitosan is dispersed in a liquid, and a solution in which unsubstituted cellulose or chitosan is dissolved in a liquid. In the method for producing porous cellulose particles according to the present disclosure, in terms of the form of the unsubstituted cellulose and the chitosan in the mixed solution, each may be dispersed or dissolved, or in a mixed state of the dispersed and dissolved.

The method for preparing the cellulose solution will be described in detail below using an exemplary case in which the solvent is a urea-alkali hydroxide aqueous solution. As for the chitosan solution, a chitosan solution can be similarly prepared using chitosan as a solute. However, as for the chitosan solution, as described above, it is desirable to obtain a chitosan solution by dissolving chitosan in an aqueous solution containing acid and then further mixing alkali hydroxide and urea. An acidic component of the aqueous solution containing acid may be any acid such as hydrogen chloride, acetic acid, formic acid, nitric acid, trifluoroacetic acid, and the like. In the next step, since this acid is completely neutralized and an excess of alkali hydroxide is required, an amount of acid is preferably not greater than the amino group of chitosan, and the minimum amount required to dissolve chitosan.

The alkali contained in the alkali hydroxide aqueous solution is preferably lithium hydroxide, sodium hydroxide, potassium hydroxide, or quaternary ammonium hydroxide, and sodium hydroxide is most preferable from the perspectives of product safety, price, and good dissolution or dispersibility.

The alkali concentration of the alkaline aqueous solution is not particularly limited, but is preferably from 3 to 20 mass % excluding a portion consumed by neutralization with an acid. When the concentration of the alkali is within this range, dispersibility, swelling property, and solubility of the unsubstituted cellulose in the alkaline aqueous solution are high, and thus such a concentration is preferable. The concentration of alkali is more preferably from 5 to 15 mass %, more preferably from 6 to 10 mass %.

Urea is further added to the alkaline aqueous solution. The concentration of urea is preferably from 10 to 15 mass %. Three components (cellulose, alkali hydroxide, and urea) are added to the water, and the order of addition is appropriately selected to optimize the dissolution state of the cellulose. Cooling the slurry thus obtained under the conditions described later produces a more transparent unsubstituted cellulose solution than the solution immediately after addition of all the components.

As described above, when the degree of polymerization of the unsubstituted cellulose is not greater than 1000, dispersibility and swelling properties in an alkaline aqueous solution are high, and thus such a degree of polymerization is preferable. Another example of the unsubstituted cellulose with improved solubility is a dissolved pulp.

A condition for mixing the alkaline aqueous solution and the unsubstituted cellulose is not particularly limited as long as an unsubstituted cellulose solution is prepared. For example, the unsubstituted cellulose may be added to an alkaline aqueous solution, or an alkaline aqueous solution may be added to the unsubstituted cellulose. Even in the case of preparing the chitosan solution, the mixing condition of the alkaline aqueous solution and the aqueous solution prepared by dissolving chitosan in the aqueous solution containing acid is not particularly limited as long as the chitosan solution can be prepared, and the aqueous solution prepared by dissolving chitosan in the aqueous solution containing acid may be added to the alkaline aqueous solution, or the alkaline aqueous solution may be added to the aqueous solution prepared by dissolving chitosan in the aqueous solution containing acid.

The unsubstituted cellulose may be suspended in water prior to mixing with the alkaline aqueous solution.

In addition, the concentration of the unsubstituted cellulose in the unsubstituted cellulose solution is not particularly limited as long as it is appropriately set such that the content in the mixed solution is to be the content described later. For example, the content may be from 1 to 10 mass %. Even in a case of the concentration of the chitosan in the chitosan solution is not particularly limited as long as it is appropriately set such that the content in the mixed solution is to be the content described later. For example, the content may be from 1 to 10 mass %.

A temperature at which the unsubstituted cellulose solution is prepared is not particularly limited, but for example, an unsubstituted cellulose solution is suitably formed by mixing the unsubstituted cellulose with an alkaline aqueous solution containing urea at room temperature, cooling to a low temperature while stirring, and then bringing back the mixture to a manageable temperature. Examples of the low temperature when cooling include from approximately 0° C. to −30° C., and preferably from approximately −5° C. to −15° C. The same applies to the temperature at the time of preparing the chitosan solution.

A mixed solution is prepared by mixing the unsubstituted cellulose solution and the chitosan solution. A mixing ratio of the unsubstituted cellulose solution and the chitosan solution is adjusted to be the content in the mixed solution described below. When the unsubstituted cellulose solution and the chitosan solution are mixed, the unsubstituted cellulose solution and the chitosan solution are preferably sufficiently stirred to be mixed into a mixed solution of one phase.

In the mixed solution, the content of the chitosan is preferably not greater than 20 mass % in the total of 100 mass % of the chitosan and unsubstituted cellulose. In the mixed solution, by setting the content of the chitosan to 20 mass %, the porous cellulose particles having a predetermined particle diameter and a predetermined opening are suitably obtained. From the viewpoint of more preferably exhibiting these properties, the content of the chitosan in the mixed solution is preferably not greater than 15 mass %, more preferably not greater than 10 mass %, and even more preferably not greater than 8 mass %, and the lower limit of the content is preferably not less than 1 mass %, more preferably not less than 2 mass %, and even more preferably not less than 3 mass %. Preferable ranges include approximately from 1 to 20 mass %, approximately from 1 to 15 mass %, approximately from 1 to 10 mass %, approximately from 1 to 8 mass %, approximately from 2 to 20 mass %, approximately from 2 to 15 mass %, approximately from 2 to 10 mass %, approximately from 2 to 8 mass %, approximately from 3 to 20 mass %, approximately from 3 to 15 mass %, approximately from 3 to 10 mass %, and approximately from 3 to 8 mass %.

In addition, the total concentration of the chitosan and the unsubstituted cellulose in the mixed solution is preferably from 1 to 10 mass %. When the concentration is not less than 1 mass %, the mechanical strength of the obtained porous cellulose particles is increased, which is preferable. When the content is not greater than 10 mass %, the viscosity of the mixed solution is low, and such a viscosity can facilitate spraying the solution from a spray nozzle such that the porous cellulose particles have, for example, a predetermined particle size as described above. The total concentration in the mixed solution is more preferably from 2 to 6 mass %, and even more preferably from 3 to 5 mass %. Note that the total concentration in the mixed solution does not include the component that fails to completely dissolve, disperse, or be swollen and to be uniform in the solution.
(Coagulating Fine Particles)

In the method for producing porous cellulose particles of the present disclosure, after the preparing a mixed solution, coagulating is performed, in which the mixed solution is brought into contact with a coagulation solvent. By bringing the mixed solution into contact with the coagulation solvent, the unsubstituted cellulose solution and the chitosan in the mixed solution are coagulated in a miscible state to obtain porous cellulose particles.

The specific aspect of the contact with the coagulation solvent described above is not particularly limited, and a known method can be used. In the coagulating fine particles, typical methods for forming the porous cellulose particles include a method in which a mixed solution is stirred and dispersed together with an optional appropriate dispersant in a liquid, the liquid having a relatively high viscosity and not miscible in the mixed solution (for example, liquid paraffin, fluorolube, or the like), and the obtained dispersion and a coagulation solvent (solvent that precipitates unsubstituted cellulose and chitosan by being mixed with the dispersion) are added while stirring.

In addition, other possible methods include a method in which the mixed solution can be formed into droplets in a gas using a spray, a nozzle, or the like, and the droplets are added into the coagulation solvent. That is, in this method of preparing the porous cellulose particles, the coagulating fine particles includes converting the mixed solution into microdroplets in a gas, and then causing the microdroplets to be absorbed by the coagulation solvent. Alternatively, the mixed solution can be extruded into a strand, placed in a coagulation solvent, solidified, and then cut or broken into amorphous particles.

The coagulation solvent is not particularly limited as long as it precipitates unsubstituted cellulose and chitosan from the mixed solution, and examples thereof include an organic solvent such as methanol, ethanol, and acetone, water, water in which salts such as salt are dissolved, and water containing an acid when the mixed solution contains alkali hydroxide.

The obtained particles can be used by being washed as they are, but it is desirable to wash the particles with an acid aqueous solution at least once or more in order to avoid elution of unnecessary components during use. That is, in the present disclosure, the method may further include washing the porous cellulose particles with an acid, the porous cellulose particles having been formed by bringing the mixed solution into contact with the coagulation solvent. Even after the washing with an acid, in the method for producing porous cellulose particles of the present disclosure, the porous cellulose particles having a chitosan content of not less than 1 mass % and not greater than 20 mass % can be suitably produced. Even after the washing with an acid, the preferred content of chitosan in the porous cellulose particles is the same value as the value described in the "1. Porous cellulose particles". The acid washing conditions are conditions in which 3 g of porous cellulose particles, which are hydrated cake-like porous cellulose particles after water has been allowed to freely flow down from above the sieve in a room temperature (25° C.) environment, are washed three times with 10 mL of hydrochloric acid (0.1 N HCl) (1 wash for about 1 hour), washed once with 5 mL of water (1 wash for about 1 hour), washed once with a solution obtained by dissolving 0.2 g of potassium carbonate in 5 mL of water (1 wash for about 1 hour), and washed twice with 10 mL of water (1 wash for about 1 hour). When such an operation is performed, it is not surprising that all acid-soluble chitosan is washed out, but in the porous cellulose particles of the present disclosure, chitosan has substantially the same skeleton as cellulose, and is partially incorporated into aggregates of cellulose molecules. Thus, it is considered that elution of chitosan is suppressed even when washed with an acid aqueous solution.

In the case of long-term storage in a wet state, a preservative such as an alcohol or sodium azide is added to prevent spoilage. In addition, the porous cellulose to which glycerin, a saccharide, urea, or the like has been added can also be dried, preferably freeze-dried.

EXAMPLES

The present disclosure will be described below in detail by presenting examples and comparative examples. Note that each of the configurations, combinations thereof, and the like in each example are merely an example, and various additions, omissions, substitutions, and other changes may be made as appropriate without departing from the spirit of the present disclosure. The present disclosure is not limited by the examples and is limited only by the claims.

First Example (Preparation of Chitosan Solution)

0.87 g of chitosan (chitosan 100, available from Wako Pure Chemical Industries, Ltd.) was dispersed in 13.84 g of water, and 6.25 g of hydrochloric acid (1 N HCl) was added thereto and stirred to prepare a clear highly viscous liquid. Furthermore, to this liquid, a solution in which 2.39 g of sodium hydroxide was dissolved in 2.06 g of water was added in portions, and the liquid underwent precipitation and clouding, losing fluidity. To this liquid, when 6.42 g of urea was added and stirred, the transparency was slightly increased. The liquid was subjected to the following operation three times: the operation included cooling the liquid on dry ice until a part of the liquid was crystallized in white, and bringing back the liquid to room temperature and stirring. Then, a substantially transparent and thixotropic liquid was obtained.

(Preparation of Unsubstituted Cellulose Solution)

In a flask, 70.35 g of sodium hydroxide was dissolved in 808.05 g of water, the solution was cooled to room temperature, and 42.11 g of powdered cellulose (Ceolus PH 101, unsubstituted cellulose solution, available from ASAHI KASEI CORPORATION) was dispersed in the solution while stirring. Furthermore, after 120.05 g of urea was added and dissolved, the mixture was cooled to −15° C. with stirring for approximately 1 hour, and then heated to room temperature using a water bath, resulting in a generally transparent solution. Note that, since the water content of the powdered cellulose was 4.25 mass %, a solvent system was 1000.24 g in total, the unsubstituted cellulose was 40.32 g, the unsubstituted cellulose concentration external was 4.0 mass %, and the unsubstituted cellulose concentration internal was 3.85 mass %.

(Preparation of Mixed Solution)

90 g of the unsubstituted cellulose solution prepared above and 10 g of the chitosan solution were mixed and stirred to prepare a uniformly mixed solution.

(Atomization)

The resulting mixed solution was sprayed to a mist form and absorbed in methanol to obtain a fine powder in a suspended state. Acetic acid was added to neutralize a methanol liquid, the fine powder was separated by filtration. The fine powder was repeatedly washed with water and porous cellulose particles (fine particles) containing chitosan was obtained.

(Acid Washing)

An appropriate amount of the obtained porous cellulose particles that were dispersed in water was put into a 20 μm sieve, and water was allowed to freely flow down. 3 g of the hydrated cake-like cellulose particles remaining on the sieve was taken and washed three times with 10 mL of hydrochloric acid (0.1 N HCl) (1 wash for about 1 hour), and washed two times with 5 mL of water, a solution obtained by dissolving 0.2 g of potassium carbonate in 5 mL of water, and 10 mL of water. The sample before and after the acid washing was dried and then subjected to elemental analysis, and the N content in the sample before the acid washing was 0.53 mass % and that in the sample after the acid washing was 0.52 mass %. The N content of 0.52 mass % is 6.0 mass % in terms of chitosan content. Since the mixing ratio of chitosan and unsubstituted cellulose in the stock solution is 7.3 mass % of chitosan, approximately 80% of chitosan used as a raw material is contained in the porous cellulose particles. Elemental analysis was performed using JM 10 Micro Coder available from J-Science Lab Co. Ltd.

(Optical Microscope Observation)

The obtained porous cellulose particles were washed with 50 mL of pure water containing sodium hydrogen carbonate for 1 hour and rinsed with pure water twice, a small amount of a lump was removed by passing the porous cellulose particles through a 200 μm sieve in water, and using a 10 μm sieve, the particles smaller than 10 μm were removed to adjust the particle diameter of the porous cellulose particles to a range of 10 to 200 μm. The obtained particles were observed with an optical microscope by transmitted light in water. The product was generally spherical, mainly particles with a diameter of 10 to 100 μm (image in FIG. 1).

(Sem Observation)

Figure 2:
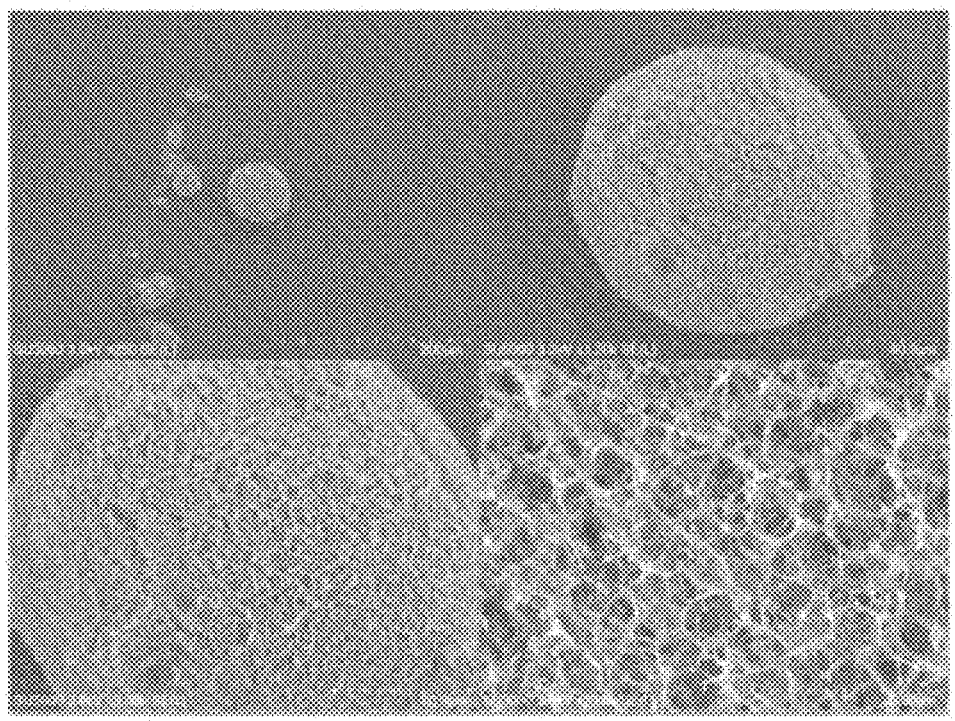
FIG. 2 is an image of the porous cellulose particles obtained in the first example observed using a scanning electron microscope.

A small amount of the obtained porous cellulose particles was dispersed in water, dripped into a metal container cooled with liquid nitrogen, frozen, and then freeze-vacuum-dried. Platinum was deposited on the obtained powder, and then the obtained powder was observed with a scanning electron microscope (HITACHI SU 5000) (acceleration voltage: 3 kV) to confirm a porous structure in which pores with a size in the range from 0.05 to 5 μm were formed on the surface. The images observed at each magnification (250 fold, 1200 fold, 20000 fold, and 100000 fold) are illustrated in FIG. 2.

(Solid Content)

The solid content of the porous cellulose particles in a hydrated state obtained in Example 1 was measured by the following method, and the solid content was 5.3 mass %. The porous cellulose particles that had settled in pure water was allowed to stand under atmospheric pressure in an environment at a temperature of 25° C. for one day. Next, approximately 2 mL of the porous cellulose particles in the pure water was drawn with a pipette, the drawn fraction was dispersed in 20 ml of a solution of a neutral detergent (for example, Mama Lemon, available from Lion Corporation) diluted 1000 times with pure water, and the solution was allowed to stand for one day to precipitate the particles. Thereafter, a supernatant was removed by decanting, and approximately ⅓ of remaining slurry, which served as one measurement sample, was placed onto filter paper (No. 131, 150 mm. ADVANTEC) corresponding to No. 3 type specified in JIS P 3801 [Filter paper (for chemical analysis)], the slurry was left to stand for 20 seconds to remove excessive moisture, a lump of the porous cellulose particles remaining on the filter paper was separated from the filter paper, and the lump was weighed, and this weight was defined as a wet mass of the porous cellulose particles. The porous cellulose particles were then dried in an oven at 80° C. for 2 hours to obtain dry mass. These operations were performed on three measurement samples, the respective proportion of dry mass to the wet mass was calculated, and the average value of three values obtained was defined as a solid content.

Second Example 9.5 parts by mass of an unsubstituted cellulose solution prepared in the same manner as in the first example and 0.5 parts by mass of chitosan solution were mixed and a portion was added with a spoon while strongly stirring approximately 200 mL of methanol to produce a bulk precipitate.

Next, this was stirred by a high-speed stirrer having blade-shaped rotary blades to prepare a slurry containing fine powder. This slurry was neutralized with a large excess of dry ice, then sufficiently washed with water, further washed with methanol twice, air-dried, and then vacuum-dried (80° C.). Further, approximately 1 mL of this precipitated portion was washed with a solution obtained by diluting 10 mL of hydrochloric acid (1N HCl) with 55 mL of water and another solution similarly obtained by diluting 5 mL of hydrochloric acid with 50 mL of water, for 30 minutes each, and then washed with 50 mL of pure water for 5 minutes, washed with 50 mL of pure water containing 100 mg of sodium hydrogen carbonate for 1 hour, rinsed with pure water twice, rinsed with 20 mL of methanol twice, and then air-dried and vacuum-dried (80° C.). The porous cellulose particles before and after the acid washing were dried from water and subjected to elemental analysis, and the nitrogen contents were 0.37 mass % and 0.28 mass %, respectively. The nitrogen content of 0.28% in the solid content after the acid washing was 3.2 mass % in terms of the chitosan content. If the total amount of the originally mixed chitosan (4.42 mass % of the total mass of cellulose and chitosan) remained, the nitrogen content would have been estimated to be 0.38 mass %. Thus, porous cellulose particles 1 before the acid washing retained almost the entire amount of chitosan, and porous cellulose particles 2 after the acid washing retained approximately 74 mass % chitosan.

(Optical Microscope Observation)

Figure 3:
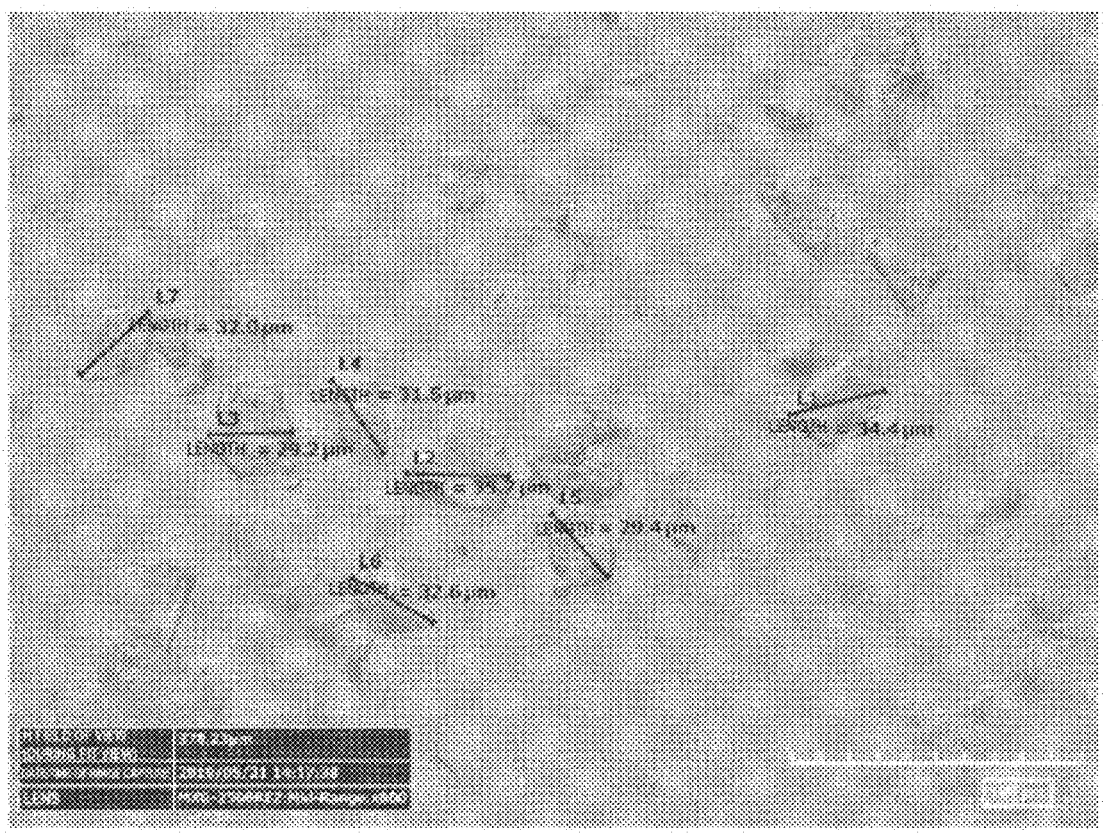
FIG. 3 is an image of porous cellulose particles obtained in a second example observed with an optical microscope.

The obtained porous cellulose particles were washed with 50 mL of pure water containing sodium hydrogen carbonate for 1 hour and rinsed with pure water twice, a small amount of a lump was removed by passing the porous cellulose particles through a 200 μm sieve in water, and the smaller particles were removed using a 10 μm sieve to adjust the particle diameter of the porous cellulose particles to a range of 10 to 200 μm. The obtained particles were observed with an optical microscope by transmitted light in water. The product was amorphous and mainly particles with a long diameter of approximately 30 μm. (image of FIG. 3)

(SEM Observation)

When the obtained porous cellulose particles were observed by a scanning electron microscope in the same manner as in the first example, a porous structure in which pores in the range of 0.05 to 5 μm were opened on the surface was confirmed.

(Solid Content)

When the porous cellulose particles obtained in the second example were impregnated with water in the same manner as in the first example, the solid content was 4.9 mass %.

The invention claimed is:

1. Porous cellulose particles comprising: unsubstituted cellulose and chitosan,
wherein a content of the chitosan is not less than 3 mass % and not greater than 8 mass % in a total of 100 mass % of the unsubstituted cellulose and the chitosan,
pores having a diameter from 0.05 to 5 μm are observed in an image of surfaces of the porous cellulose particles observed by a scanning electron microscope, and
a proportion of porous cellulose particles having a particle diameter from 10 to 200 μm is not less than 90 mass %.

2. The porous cellulose particles according to claim 1, wherein a solid content of the porous cellulose particles in a hydrated state is not greater than 10 mass %, the solid content of the porous cellulose particles in the hydrated state being measured by a solid content measurement method and the solid content measurement method includes performing operation of:
allowing the porous cellulose particles to settle in pure water, and allowing the settled porous cellulose particles to stand under atmospheric pressure in an environment at a temperature of 25° C. for one day or more;
then, drawing approximately 2 mL of the porous cellulose particles in the pure water with a pipette to obtain a drawn fraction, dispersing the drawn fraction in 20 ml of a solution of neutral detergent diluted 1000 times with pure water, and allowing the solution to stand for one day or more to precipitate the porous cellulose particles;
then, removing a supernatant by decanting to form a remaining slurry, placing approximately ⅓ of the remaining slurry, which serves as one measurement sample, onto filter paper corresponding to No. 3 type specified in JIS P 3801, Filter paper for chemical analysis, leaving the slurry to stand for 20 seconds to remove excessive moisture to form porous cellulose particles in a hydrated state, separating a lump of the porous cellulose particles in the hydrated state remaining on the filter paper from the filter paper, and weighing the lump, the weight being defined as a wet mass of the porous cellulose particles in the hydrated state; and
then, drying the porous cellulose particles in the hydrated state in an oven at 80° C. for 2 hours, and weighing the porous cellulose particles, the weight being defined as a dry mass, and
performing the operation on three measurement samples, calculating a respective proportion of dry mass to the wet mass, and determining an average value of three values, the average value being defined as the solid content of the porous cellulose particles in the hydrated state.

3. A method for producing porous cellulose particles, comprising:
preparing a mixed solution in which an unsubstituted cellulose solution, a chitosan solution, and a solvent of the mixed solution are mixed; and
bringing the mixed solution into contact with a coagulation solvent,
wherein the solvent of the mixed solution is an aqueous solution containing alkali hydroxide and urea, and
wherein the porous cellulose particles comprise: unsubstituted cellulose and chitosan,
wherein a content of the chitosan is not less than 3 mass % and not greater than 8 mass % in a total of 100 mass % of the unsubstituted cellulose and the chitosan, pores having a diameter from 0.05 to 5 μm are observed in an image of surfaces of the porous cellulose particles observed by a scanning electron microscope, and a proportion of porous cellulose particles having a particle diameter from 10 to 200 μm is not less than 90 mass %.

4. The method for producing porous cellulose particles according to claim 3, further comprising:
washing the porous cellulose particles with an acid, the porous cellulose particles having been formed by the bringing the mixed solution into contact with the coagulation solvent.

5. The method for producing porous cellulose particles according to claim 3, wherein the preparing a mixed solution includes
dissolving chitosan in an aqueous solution containing acid and further mixing the solution with alkali hydroxide and urea to prepare the chitosan solution,
mixing unsubstituted cellulose, alkali hydroxide, urea, and water to prepare the unsubstituted cellulose solution, and
mixing the chitosan solution cooled to a temperature of not higher than −10° C. and the unsubstituted cellulose solution.

* * * * *